(12) United States Patent
Ding et al.

(10) Patent No.: US 10,336,579 B2
(45) Date of Patent: Jul. 2, 2019

(54) METAL COATING OF LOAD BEARING MEMBER FOR ELEVATOR SYSTEM

(71) Applicant: Otis Elevator Company, Farmington, CT (US)

(72) Inventors: Zhongfen Ding, South Windsor, CT (US); Paul Papas, West Hartford, CT (US); Aaron T. Nardi, East Granby, CT (US); Daniel A. Mosher, Glastonbury, CT (US); Brad Guilani, Woodstock Valley, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 369 days.

(21) Appl. No.: 15/083,621

(22) Filed: Mar. 29, 2016

(65) Prior Publication Data
US 2017/0283219 A1 Oct. 5, 2017

(51) Int. Cl.
*B66B 7/06* (2006.01)
*B29D 29/00* (2006.01)
(Continued)

(52) U.S. Cl.
CPC ............ *B66B 7/062* (2013.01); *B29D 29/00* (2013.01); *C23C 24/04* (2013.01); *D07B 5/006* (2015.07); *B29K 2021/00* (2013.01); *B29K 2105/106* (2013.01); *B66B 9/00* (2013.01); *D07B 1/22* (2013.01); *D07B 2201/2087* (2013.01);
(Continued)

(58) Field of Classification Search
CPC ....... B29D 29/00; B66B 7/062; B66B 7/1261; B66B 11/008; C23C 24/04; D07B 1/22; D07B 2501/2007; D07B 2801/22; D07B 2205/3021; D07B 2205/306; D07B 2205/3071; D07B 2205/3075; D07B 2501/403; D07B 5/006; D07B 2201/1008; D07B 2201/2078; D07B 2201/2088;
(Continued)

(56) References Cited

U.S. PATENT DOCUMENTS 4,705,161 A 11/1987 Gozdiff
5,119,927 A 6/1992 Bruggemann
(Continued)

FOREIGN PATENT DOCUMENTS

DE 102009006063 A1 7/2010
EP 0372245 A1 6/1990
(Continued)

OTHER PUBLICATIONS

International Search Report for International Application No. PCT/US2017/024708; International Filing Date Mar. 29, 2017; dated Jul. 28, 2017, 7 pages.
(Continued)

*Primary Examiner* — Camie S Thompson
(74) *Attorney, Agent, or Firm* — Cantor Colburn LLP

(57) ABSTRACT

A belt for an elevator system includes a plurality of tension members arranged along a belt width and a jacket material at least partially encapsulating the plurality of tension members defining a traction surface, a back surface opposite the traction surface together with the traction surface defining a belt thickness, and two end surfaces extending between the traction surface and the back surface defining the belt width. A metallic coating layer is applied via deposition of solid particles over at least one end surface of the two end surfaces.

9 Claims, 4 Drawing Sheets

(51) Int. Cl.
*C23C 24/04* (2006.01)
*D07B 5/00* (2006.01)
*B29K 21/00* (2006.01)
*B29K 105/10* (2006.01)
*B66B 9/00* (2006.01)
*D07B 1/22* (2006.01)

(52) U.S. Cl.
CPC ........ *D07B 2201/2088* (2013.01); *D07B 2201/2092* (2013.01); *D07B 2205/306* (2013.01); *D07B 2205/3021* (2013.01); *D07B 2205/3071* (2013.01); *D07B 2205/3075* (2013.01); *D07B 2205/3092* (2013.01); *D07B 2205/507* (2013.01); *D07B 2401/2035* (2013.01); *D07B 2501/2007* (2013.01)

(58) Field of Classification Search
CPC .......... B29K 2021/00; B29K 2105/106; B66D 9/00; Y10T 428/329
USPC .............................................. 428/76; 187/251
See application file for complete search history.

(56) References Cited

U.S. PATENT DOCUMENTS

| | | |
|---|---|---|
| 7,168,231 B1 | 1/2007 | Chou et al. |
| 7,256,431 B2 | 8/2007 | Okamoto |
| 8,389,126 B2 | 3/2013 | Kusinski et al. |
| 8,999,226 B2 | 4/2015 | Burns et al. |
| 9,109,292 B2 | 8/2015 | Arnold et al. |
| 2010/0133046 A1 | 6/2010 | Allwardt et al. |
| 2011/0259676 A1 | 10/2011 | Nardi et al. |
| 2011/0318497 A1 | 12/2011 | Beals et al. |
| 2012/0329591 A1 | 12/2012 | Goeser et al. |
| 2013/0171463 A1 | 7/2013 | Chang et al. |
| 2013/0186304 A1 | 7/2013 | Pabla et al. |
| 2014/0027211 A1 | 1/2014 | Wesson et al. |
| 2014/0076669 A1 | 3/2014 | Wesson et al. |
| 2015/0079331 A1 | 3/2015 | Hung et al. |
| 2015/0191331 A1 | 7/2015 | Orelup et al. |
| 2015/0259176 A1 | 9/2015 | Goeser et al. |

FOREIGN PATENT DOCUMENTS

| | | |
|---|---|---|
| EP | 2913288 A1 | 9/2015 |
| NL | 1009745 C1 | 6/1999 |

OTHER PUBLICATIONS

Written Opinion for International Application No. PCT/US2017/024708; International Filing Date Mar. 29, 2017; dated Jul. 28, 2017, 5 pages.

European Patent No. 0372245; Date of Publication: Jun. 13, 1990; Abstract Only, 2 pages.

Netherlands Patent No. 1009742; Date of Publication: Jun. 8, 1999; Abstract Only, 1 page.

V.K Champagne and D.J. Helfritch, "Mainstreaming Cold Spray—Push for Applications"; Surface Engineering 2014, vol. 30, No. 6, Institute of Materials, Minerals, and Mining; 8 pages.

METAL COATING OF LOAD BEARING MEMBER FOR ELEVATOR SYSTEM

BACKGROUND

Embodiments disclosed herein relate to elevator systems, and more particularly, to coating of a load bearing member for use in an elevator system.

Elevator systems are useful for carrying passengers, cargo, or both, between various levels in a building. Some elevators are traction based and utilize load bearing members such as ropes or belts for supporting the elevator car and achieving the desired movement and positioning of the elevator car.

Where ropes are used as load bearing members, each individual rope is not only a traction device for transmitting the pulling forces but also participates directly in the transmission of the traction forces. Where belts are used as a load bearing member, a plurality of tension elements are embedded in a common elastomer belt body. The tension elements are exclusively responsible for transmitting the pulling forces, while the elastomer material transmits the traction forces. In some belts, the tension members are cords formed from a plurality of elements such as steel wires, while in other belts the tension members may be formed from unidirectional fibers arranged in a rigid matrix composite, providing significant benefits when used in elevator systems, particularly high rise systems. Fire retardation standards are some of the key safety requirements that each belt is required to meet.

BRIEF SUMMARY

In one embodiment, a belt for an elevator system includes a plurality of tension members arranged along a belt width and a jacket material at least partially encapsulating the plurality of tension members defining a traction surface, a back surface opposite the traction surface together with the traction surface defining a belt thickness, and two end surfaces extending between the traction surface and the back surface defining the belt width. A metallic coating layer is applied via deposition of solid particles over at least one end surface of the two end surfaces.

Additionally or alternatively, in this or other embodiments the metallic coating layer is disposed at the at least one end surface and a selected portion of the traction surface and/or the back surface.

Additionally or alternatively, in this or other embodiments the metallic coating layer includes tin, zinc, aluminum, or alloys or combinations thereof.

Additionally or alternatively, in this or other embodiments the metallic coating layer includes one or more additives with lubricating properties to reduce friction between the belt and one or more elevator system components.

Additionally or alternatively, in this or other embodiments the one or more additives include a ceramic material.

Additionally or alternatively, in this or other embodiments the ceramic material includes molybdenum disulfide, molybdenum diselenide, or tungsten disulfide, or fluoropolymers such as polytetrafluoroethylene.

Additionally or alternatively, in this or other embodiments the metallic coating layer is applied as a powder via a cold spray process.

Additionally or alternatively, in this or other embodiments the metallic coating layer is configured to improve flame retardation properties of the belt.

Additionally or alternatively, in this or other embodiments the jacket material is an elastomeric material.

In another embodiment, a method for forming a belt for an elevator system includes forming one or more tension elements and at least partially enclosing the one or more tension elements in a jacket material, the jacket material defining a traction surface, a back surface opposite the traction surface together with the traction surface defining a belt thickness, and two end surfaces extending between the traction surface and the back surface defining the belt width. A metallic coating layer is applied via application of solid metal particles to at least one end surface of the two end surfaces after at least partially enclosing the one or more tension elements in the jacket material to improve fire retardation properties of the belt.

Additionally or alternatively, in this or other embodiments the metallic coating layer is applied to the at least one end surface and a selected portion of the traction surface and/or the back surface.

Additionally or alternatively, in this or other embodiments applying the metallic coating layer further includes urging a carrier gas flow through a nozzle, injecting a metallic powder material into the carrier gas flow, impacting the metallic powder on the at least one end surface, and adhering the metallic powder to the at least one end surface.

Additionally or alternatively, in this or other embodiments the metallic powder material is injected into the carrier gas flow downstream of a nozzle throat.

Additionally or alternatively, in this or other embodiments the metallic coating layer includes tin, zinc, aluminum, or alloys or combinations thereof.

Additionally or alternatively, in this or other embodiments the metallic coating layer includes one or more additives with lubricating properties to reduce friction between the belt and one or more elevator system components.

In another embodiment, a method of forming a belt for an elevator system includes continuously forming one or more tension elements and continuously extruding a jacket material around the one or more tension elements at least partially enclosing the one or more tension elements in the jacket material via an extruder, the jacket material defining a traction surface, a back surface opposite the traction surface together with the traction surface defining a belt thickness, and two end surfaces extending between the traction surface and the back surface defining the belt width. One or more nozzles are positioned downstream of the extruder, the belt is urged past the one or more nozzles, a carrier gas flow is urged through the nozzle, a metallic powder material is injected into the carrier gas flow, the metallic powder in impacted on at least one end surface, and the metallic powder is adhered to the at least one end surface, forming a continuous metallic coating layer at the at least one end surface as the belt passes the one or more nozzles.

Additionally or alternatively, in this or other embodiments the metallic coating layer is applied to the at least one end surface and a selected portion of the traction surface and/or the back surface.

Additionally or alternatively, in this or other embodiments the metallic coating layer includes tin, zinc, aluminum, nickel, or alloys or combinations thereof.

Additionally or alternatively, in this or other embodiments the metallic coating layer includes one or more additives with lubricating properties to reduce friction between the belt and one or more elevator system components.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

The detailed description explains disclosed embodiments, together with advantages and features, by way of example with reference to the drawings.

DETAILED DESCRIPTION

Figure 1:
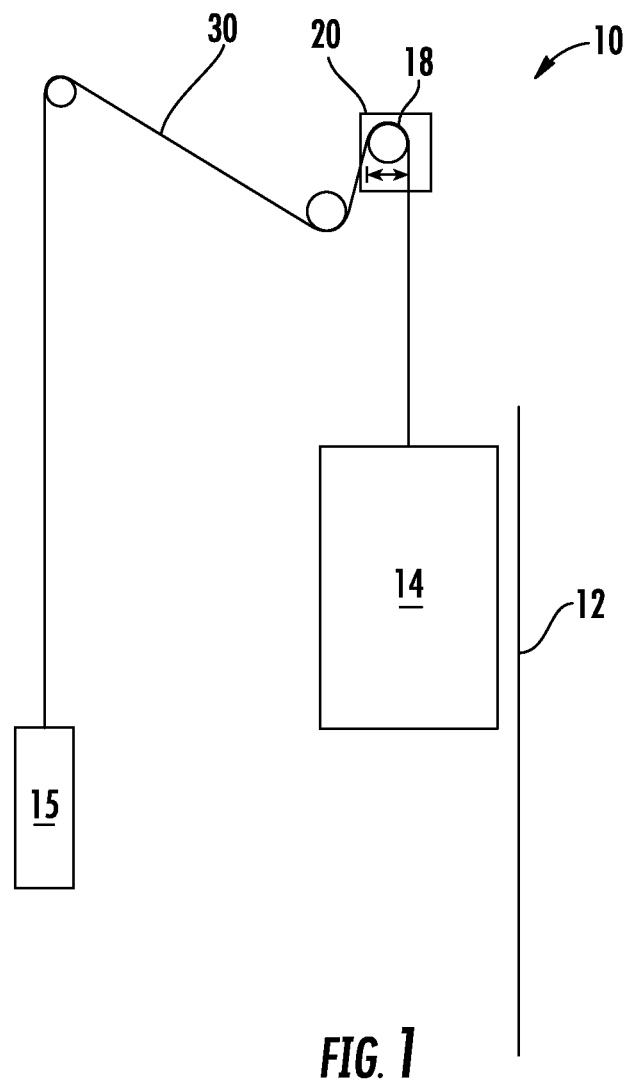
FIG. 1 is a perspective view of an example of a traction elevator system.

Referring now to FIG. 1, an exemplary embodiment of an elevator system 10 is illustrated. The elevator system 10 includes an elevator car 14 configured to move vertically upwardly and downwardly within a hoistway 12 along a plurality of car guide rails (not shown). Guide assemblies mounted to the top and bottom of the elevator car 14 are configured to engage the car guide rails to maintain proper alignment of the elevator car 14 as it moves within the hoistway 12.

The elevator system 10 also includes a counterweight 15 configured to move vertically upwardly and downwardly within the hoistway 12. The counterweight 15 moves in a direction generally opposite the movement of the elevator car 14 as is known in conventional elevator systems. Movement of the counterweight 15 is guided by counterweight guide rails (not shown) mounted within the hoistway 12. In the illustrated, non-limiting embodiment, at least one load bearing member 30, for example, a belt, coupled to both the elevator car 14 and the counterweight 15 cooperates with a traction sheave 18 mounted to a drive machine 20. To cooperate with the traction sheave 18, at least one load bearing member 30 bends in a first direction about the traction sheave 18. In one embodiment, any additional bends formed in the at least one load bearing member 30 must also be in the same first direction. Although the elevator system 10 illustrated and described herein has a 1:1 roping configuration, elevator systems 10 having other roping configurations and hoistway layouts are within the scope of the present disclosure.

Figure 2:
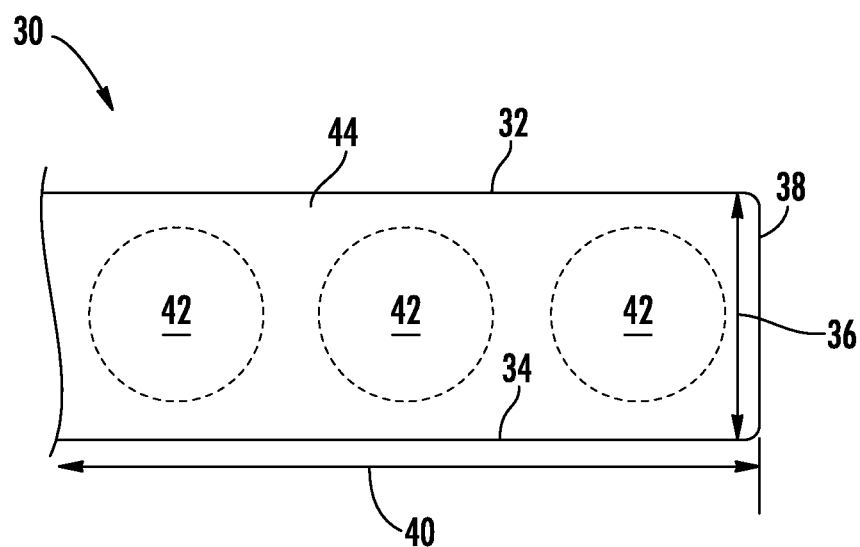
FIG. 2 is a cross-sectional view of an exemplary embodiment of a belt for an elevator system.

Referring now to FIG. 2, a partial cross-sectional view of an exemplary load bearing member or belt 30 is illustrated. The belt 30 includes a traction surface 32 interactive with the traction sheave 18, and a back surface 34 opposite the traction surface 32 and defining a belt thickness 36 therebetween. The belt 30 further includes two end surfaces 38 (one shown in the partial cross-section of FIG. 2) extending between the traction surface 32 and the back surface 34 and defining a belt width 40 therebetween. In some embodiments, the belt 30 has an aspect ratio of belt width 40 to belt thickness 36 that is greater than one.

The belt 30 includes plurality of tension members 42 extending along the belt 30 length and arranged across the belt width 40. In some embodiments, the tension members 42 are equally spaced across the belt width 40. The tension members 42 are at least partially enclosed in a jacket material 44 to restrain movement of the tension members 42 in the belt 30 and to protect the tension members 42. The jacket material 44 defines the traction surface 32 configured to contact a corresponding surface of the traction sheave 18. Exemplary materials for the jacket material 44 include the elastomers of thermoplastic and thermosetting polyurethanes, polyamide, thermoplastic polyester elastomers, and rubber, for example. Other materials may be used to form the jacket material 44 if they are adequate to meet the required functions of the belt 30. For example, a primary function of the jacket material 44 is to provide a sufficient coefficient of friction between the belt 30 and the traction sheave 18 to produce a desired amount of traction therebetween. The jacket material 44 should also transmit the traction loads to the tension members 42. In addition, the jacket material 44 should be wear resistant and protect the tension members 42 from impact damage, exposure to environmental factors, such as chemicals, for example.

Figure 3:
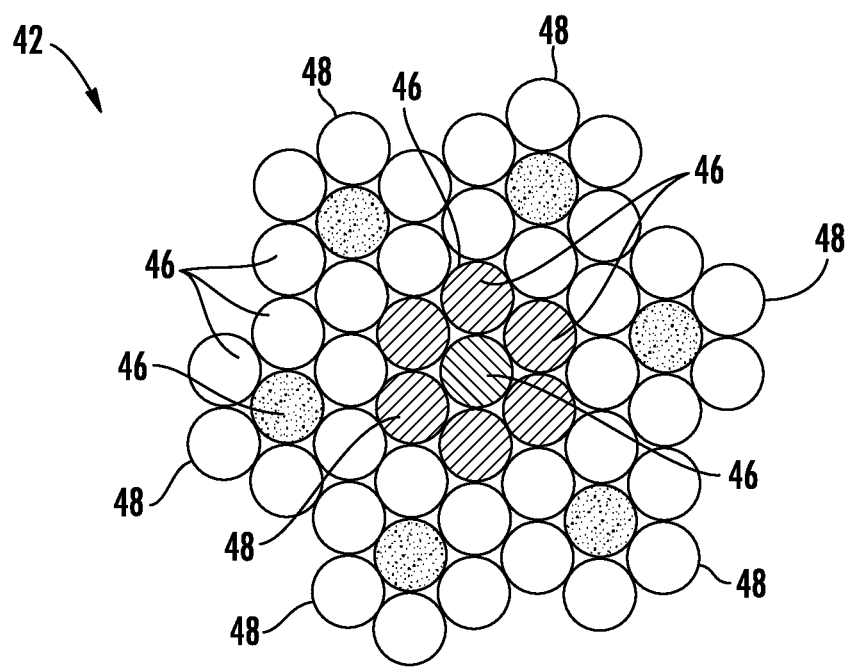
FIG. 3 is a cross-sectional view of an exemplary embodiment of a tension member for a belt.

In some embodiments, as shown in FIGS. 2 and 3, each tension member 42 is formed from a plurality of metallic, for example steel, wires 46, arranged into a plurality of strands 48, which are in turn arranged into a cord, or tension member 42. In other embodiments, the tension members 42 may be formed from other materials and may have other configurations. For example, in some embodiments, the tension member 42 may be formed from a plurality of fibers arranged in a rigid matrix composite. While in the embodiment shown there are six tension members 42 in the belt 30, the number of tension members 42 is merely exemplary. In other embodiments, for example, one, two, three, four, five, seven or more tension members 42 may be utilized. It is to be appreciated that arrangement of wires 46 shown in FIG. 3 is merely exemplary, and that other arrangements of wires 46 to form tension members 42 are contemplated within the scope of the present disclosure.

Figure 4:
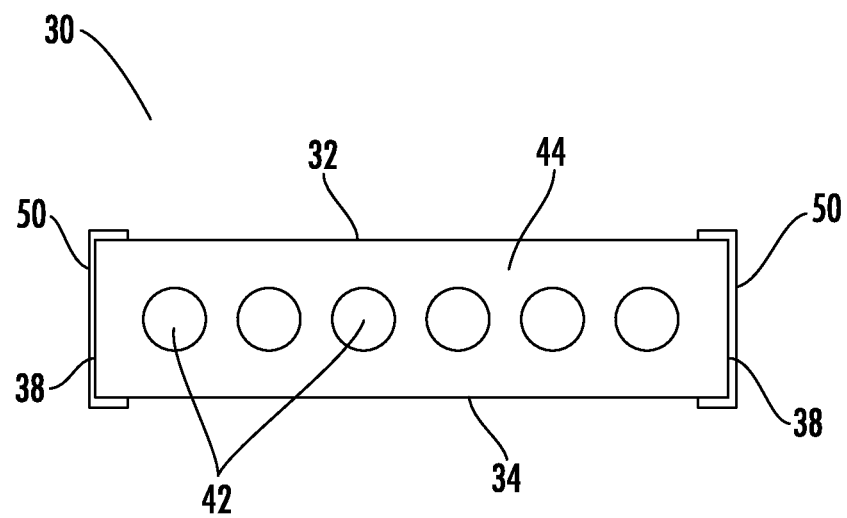
FIG. 4 is a perspective view of an exemplary embodiment of a belt for an elevator system.

Referring now to FIG. 4, fire safety performance of the belt 30 is improved with a metallic coating layer 50 over the jacket material 44 at the end surfaces 38, and in some embodiments wrapping partially around the belt 30 to extend onto the traction surface 32 and/or the back surface 34. The metallic coating layer 50 is particularly effective in preventing flame propagation around the belt 30 from the traction surface 32 to the back surface 34 or vice versa, via the end surfaces 38. In some embodiments, the metallic coating layer 50 may extend to cover up to about 40% of the width of the traction surface 32 and/or the back surface 34. In other embodiments, the metallic coating layer 50 may extend to cover between 10% and 20% of the width of the traction surface 32 and/or the back surface 34. In one embodiment, the metallic coating layer 50 extends 0.1"-0.4" (2.5-10.2 millimeters) onto the traction surface 32 and/or the back surface 34.

Figure 5:
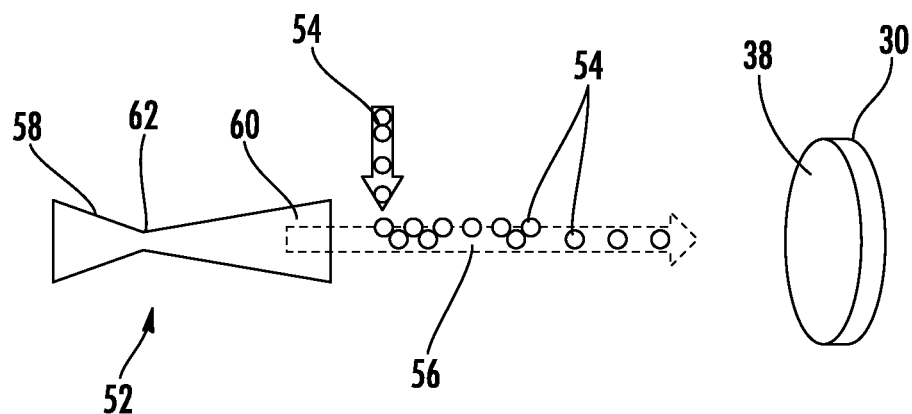
FIG. 5 is an illustration of an embodiment of a manufacturing process for a belt.

The metallic coating layer 50 is applied to the belt 30 after application of the jacket material 44 by deposition or embedding of solid particles at the end surface 38, the traction surface 32 and/or the back surface 34. The application of the metallic coating layer 50 may be via a cold spray process, a dusting process, a rolling process, or the like. One embodiment of a cold spray process to form the metallic coating layer 50 is illustrated in FIG. 5. In the embodiment of FIG. 5, the belt is arranged in a rolled shape with an end surface 38 facing a spray nozzle 52. The spray nozzle 52 directs a spray of metal powder 54 toward the belt 30, utilizing a carrier gas 56 such as Nitrogen, Helium or Argon. The metal powder 54 may include, for example, tin (Sn), zinc (Zn), aluminum (Al), nickel (Ni), and/or alloys of these materials. As the metal coating layer 50 may increase friction between the belt and elevator system 10 surfaces, such as the traction sheave 18 increasing wear, the metallic coating layer 50 may include other materials in addition to the metal materials to act as lubricants. These lubricant materials may include, for example, molybdenum disulfide ($MoS_2$), molybdenum diselenide ($MoSe_2$), tungsten disulfide ($WS_2$), polytetrafluoroethylene, other fluoropolymers, or other layered ceramic materials.

The spray nozzle 52 is configured with a converging portion 58, a diverging portion 60 at a nozzle exit 60 and a nozzle throat 62 between the converging portion 58 and the diverging portion 60. In some embodiments, because of a relatively low melting point of the metal powders 54 utilized, the metal powder 54 is added to the carrier gas 56 at a point downstream of the nozzle throat 62, as shown in FIG. 5. In other embodiments, however, the metal powder 54 may be added to the carrier gas 56 upstream of the nozzle throat 62 or at the nozzle throat 62, depending on the carrier gas 56 temperature and velocity and the melting point of the metal powder 54.

In the embodiment of FIG. 5, the spray nozzle 52 applies the metallic coating layer 50 to a first end surface 38, along with selected portions of traction surface 32 and back surface 34. The belt 30 in its rolled configuration is turned so the second end surface 38 is facing the spray nozzle 52, and the spray nozzle applies the metallic coating layer 50 to the second end surface 38. Alternatively, the spray nozzle 52 may be moved to spray the second end surface 38 or multiple spray nozzles 52 may be utilized to spray end surfaces 38 without moving the belt 30 or the spray nozzle 52. Application of the metallic coating layer 50 via each spray nozzle 52 may performed simultaneously or by a staggered process. In some embodiments, the metallic coating layer 50 applied to the second end surface 38 may have a same composition as the metallic coating layer 50 applied to the first end surface 38, while in other embodiments the two metallic coating layers 50 be different.

Figure 6:
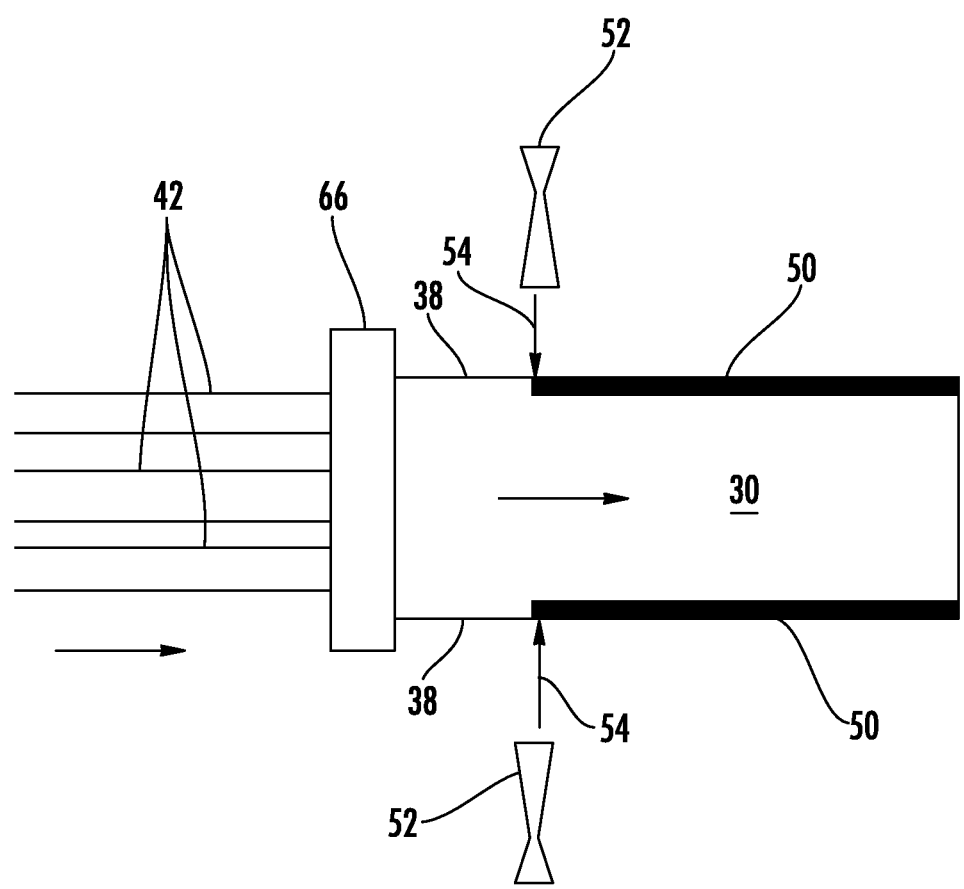
FIG. 6 is an illustration of another embodiment of a manufacturing process for a belt.

In another embodiment, shown in FIG. 6, application of the metallic coating layer 50 may be an integrated part of a continuous belt 30 manufacturing process. In the process of FIG. 6, the tension members 42 are formed and are placed in a selected arrangement. The tension members 42 are then urged through an extruder 66 or other applicator where the jacket material 44 is applied to the tension members 42 forming belt 30. One or more spray nozzles 52 are located downstream of the extruder 66 and apply the metallic coating layer 50 to the end surface 38 and selected portions of the traction surface 32 and back surface 34 as the belt 30 passes the spray nozzles 52. In some embodiments, at least one spray nozzle 52 is located at each end surface 38 so that the metallic coating layer 50 may be applied to both end surfaces 38 simultaneously. Applying the metallic coating layer 50 as part of a continuous belt manufacturing process has the additional advantage of streamlining the manufacturing process. Further, the belt 30 has an elevated temperature and is relatively soft after leaving the extruder 66, so applying the metallic coating layer 50 soon after the belt 30 is formed at the extruder 66 may improve adhesion of the metallic coating layer 50 to the jacket material 44.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in spirit and/or scope. Additionally, while various embodiments have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A method for forming a belt for an elevator system comprising:
    forming one or more tension elements;
    at least partially enclosing the one or more tension elements in a jacket material, the jacket material defining:
        a traction surface;
        a back surface opposite the traction surface together with the traction surface defining a belt thickness; and
        two end surfaces extending between the traction surface and the back surface defining the belt width; and
    applying a metallic coating layer via application of solid metal particles to at least one end surface of the two end surfaces after at least partially enclosing the one or more tension elements in the jacket material to improve fire retardation properties of the belt;
    wherein applying the metallic coating layer further comprises:
        urging a carrier gas flow through a nozzle;
        injecting a metallic powder material into the carrier gas flow;
        impacting the metallic powder on the at least one end surface; and
        adhering the metallic powder to the at least one end surface.

2. The method of claim 1, further comprising applying the metallic coating layer to the at least one end surface and a selected portion of the traction surface and/or the back surface.

3. The method of claim 1, wherein the metallic powder material is injected into the carrier gas flow downstream of a nozzle throat.

4. The method of claim 1, wherein the metallic coating layer includes tin, zinc, aluminum, nickel, or alloys or combinations thereof.

5. The method of claim 1, wherein the metallic coating layer includes one or more additives with lubricating properties to reduce friction between the belt and one or more elevator system components, the one or more additives including one or more of molybdenum disulfide, molybdenum diselenide, or tungsten disulfide, or fluoropolymers such as polytetrafluoroethylene.

6. A method of forming a belt for an elevator system, comprising:
    continuously forming one or more tension elements;
    continuously extruding a jacket material around the one or more tension elements at least partially enclosing the one or more tension elements in the jacket material via an extruder, the jacket material defining:
        a traction surface;
        a back surface opposite the traction surface together with the traction surface defining a belt thickness; and
        two end surfaces extending between the traction surface and the back surface defining the belt width; and
    positioning one or more nozzles downstream of the extruder;
    urging the belt past the one or more nozzles;
    urging a carrier gas flow through the nozzle;

injecting a metallic powder material into the carrier gas flow;

impacting the metallic powder on at least one end surface; and adhering the metallic powder to the at least one end surface, forming a continuous metallic coating layer at the at least one end surface as the belt passes the one or more nozzles.

7. The method of claim 6, further comprising applying the metallic coating layer to the at least one end surface and a selected portion of the traction surface and/or the back surface.

8. The method of claim 6, wherein the metallic coating layer includes tin, zinc, aluminum, nickel, or alloys or combinations thereof.

9. The method of claim 6, wherein the metallic coating layer includes one or more additives with lubricating properties to reduce friction between the belt and one or more elevator system components.

* * * * *